(No Model.)

E. W. McGUIRE.
HANDLE ATTACHMENT FOR LAWN MOWERS.

No. 561,426. Patented June 2, 1896.

Attest
C. W. Miles
Oliver B. T. Kaiser

Inventor
Elwood W. McGuire
by Wood & Boyd
Attorneys

UNITED STATES PATENT OFFICE.

ELWOOD W. McGUIRE, OF RICHMOND, INDIANA.

HANDLE ATTACHMENT FOR LAWN-MOWERS.

SPECIFICATION forming part of Letters Patent No. 561,426, dated June 2, 1896.

Application filed August 10, 1895. Serial No. 558,914. (No model.)

*To all whom it may concern:*

Be it known that I, ELWOOD W. MCGUIRE, a citizen of the United States, residing at Richmond, in the county of Wayne and State of Indiana, have invented certain new and useful Improvements in Handle Attachments for Lawn-Mowers, of which the following is a specification.

My invention relates to the method of making fastenings for lawn-mower handles.

As heretofore constructed the iron shanks of lawn-mower handles have been inserted through a loop or ear cast on with the frame-plate of the wheel projecting from the periphery thereof. These loops or ears being made of cast-iron break easily; and the object of my invention is to overcome this difficulty by providing a hook-fastening at the end of the shank of the handle.

The various features of my invention are fully set forth in the description of the accompanying drawings, making a part of this specification, in which—

Figure 1:
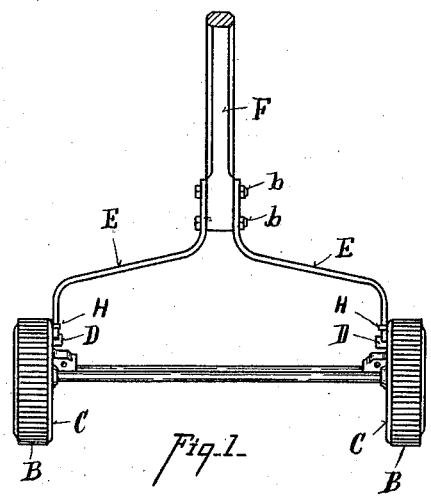
Figure 2:
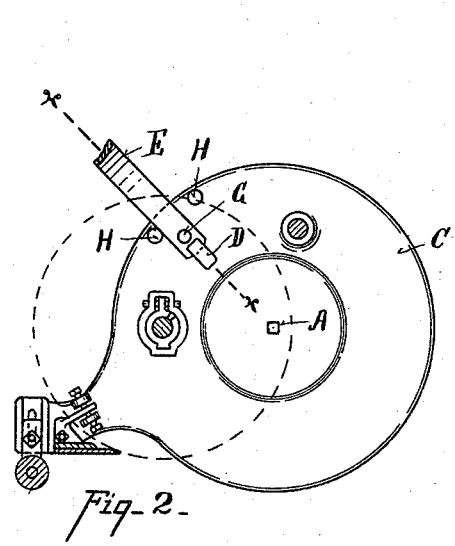
Figure 3:
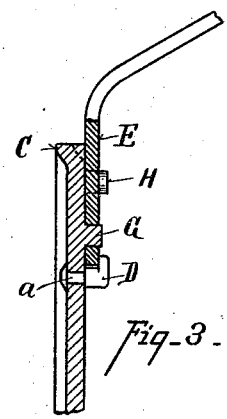
Figure 4:
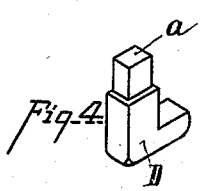

Figure 1 is an elevation of a lawn-mower with the knives removed. Fig. 2 is an inside plan view of the frame-plate and shank attachments of the wheel. Fig. 3 is a section on line *x x*, Fig. 2. Fig. 4 is a perspective view of the fastening-hook.

A represents the axle, and B the driving-wheels. C represents the frame-plates upon which the axle journals and upon which the roller and stationary knife are mounted. These parts are of the usual construction.

D represents hooks projecting inward from the frame-plates, the point of the hook turning upward and engaging over the end of the curved shanks E, to which the wooden handle F is attached.

G represents a stud-pin on which the handle-shanks are journaled.

H H represent lugs or stops which prevent the handle from moving too far upon its pivot.

The hooks D may be cast on and with the frame-plate; but I prefer to provide it with a shank *a*, which passes through a hole pierced in the frame-plates, and the end of the same is headed down, enabling the hook to be made of malleable iron or steel, or it may be cast integral on the plate. Being upon the inside and below the periphery it would be made strong, even of cast-iron. By fastening the shanks to the handle by screw-bolts *b* the shanks are kept spread in the form of a bail, and the hook D prevents their spreading inward, and hence moving off of the stud-pin G.

Having described my invention, what I claim is—

1. A fastening for lawn-mower handles formed upon the inside of the plates, consisting of the stops, the stud-pin, the bent shanks of the handle engaging thereon and the hooks D engaging with said shanks, substantially as specified.

2. In combination with the frame-plate of a lawn-mower, the hook D provided with the shank *a* tapping through the frame-plate and engaging with the ends of the handle-shank E and a pin G connecting the handle-shank and frame-plate, substantially as specified.

In testimony whereof I have hereunto set my hand.

ELWOOD W. McGUIRE.

Witnesses:
N. WOOD,
T. F. BAKER.